United States Patent
Ogawa et al.

(10) Patent No.: US 6,946,043 B1
(45) Date of Patent: Sep. 20, 2005

(54) FILLED ARTICLE

(75) Inventors: Taro Ogawa, Kurashiki (JP);
Yasumasa Senoo, Kurashiki (JP);
Yasuyuki Toda, Kurashiki (JP); Mitsuo Katayama, Okayma (JP); Takahiro Hara, Owariasahi (JP)

(73) Assignee: Namba Press Works Co., Ltd., Kurashiki (JP)

( * ) Notice: Subject to any disclaimer, the term of this patent is extended or adjusted under 35 U.S.C. 154(b) by 0 days.

(21) Appl. No.: 09/857,892

(22) PCT Filed: Feb. 17, 2000

(86) PCT No.: PCT/JP00/00908

§ 371 (c)(1),
(2), (4) Date: Jun. 11, 2001

(87) PCT Pub. No.: WO01/26875

PCT Pub. Date: Apr. 19, 2001

(30) Foreign Application Priority Data

Oct. 12, 1999 (JP) .................................. 11-289480

(51) Int. Cl.[7] .......................... B29C 39/10; B29C 39/24
(52) U.S. Cl. .......................... 156/78; 156/245; 156/285; 264/46.6; 264/46.8; 264/101; 264/121; 264/257
(58) Field of Search ................. 156/78, 245; 264/46.6, 264/46.8, 119, 1

(56) References Cited

U.S. PATENT DOCUMENTS

| | | | |
|---|---|---|---|
| 4,839,393 A | | 6/1989 | Buchanan et al. ............. 521/53 |
| 5,132,063 A | * | 7/1992 | Hughes ..................... 264/46.4 |
| 5,482,665 A | * | 1/1996 | Gill ............................ 264/113 |
| 6,033,501 A | * | 3/2000 | Yamaguchi et al. ....... 156/62.2 |
| 6,033,607 A | * | 3/2000 | Kataoka et al. ............ 264/40.3 |
| 6,096,249 A | * | 8/2000 | Yamaguchi ................ 264/40.3 |

FOREIGN PATENT DOCUMENTS

| | | |
|---|---|---|
| DE | 15 04 056 A | 7/1969 |
| DE | 196 43 563 A | 4/1998 |
| DE | 196 52 690 A | 6/1998 |
| DE | 197 54 180 A | 6/1998 |
| FR | 2 231 505 A | 12/1974 |
| GB | 1 489 462 A | 10/1977 |
| JP | 51-32876 | 3/1976 |
| JP | 53 021268 A | 2/1978 |
| JP | 56 060229 A | 7/1981 |
| JP | 58 181619 A | 1/1984 |
| JP | 59 114035 A | 10/1984 |
| JP | 06 328550 A | 3/1995 |
| JP | 7 290466 A | 3/1996 |
| JP | 8-72074 | 3/1996 |
| JP | 8-72075 | 3/1996 |
| JP | 8 072083 A | 7/1996 |
| JP | 8-258059 | 10/1996 |

* cited by examiner

Primary Examiner—Sam Chuan Yao
(74) Attorney, Agent, or Firm—Renner, Kenner, Greive, Bobak, Taylor & Weber

(57) ABSTRACT

A method for manufacturing a padded body composed of a skin layer formed in a bag shape and filler made of a granular or fragmental material padded into the skin layer comprising the steps of: mixing the filler and a water reactive binder; padding a mixture of the filler and the binder into the skin layer to form a padded body; and passing steam through the padded body. The binder reacts to the steam so that the filler adheres each other and adheres to an inner surface of the skin layer.

6 Claims, 11 Drawing Sheets

Fig. 4
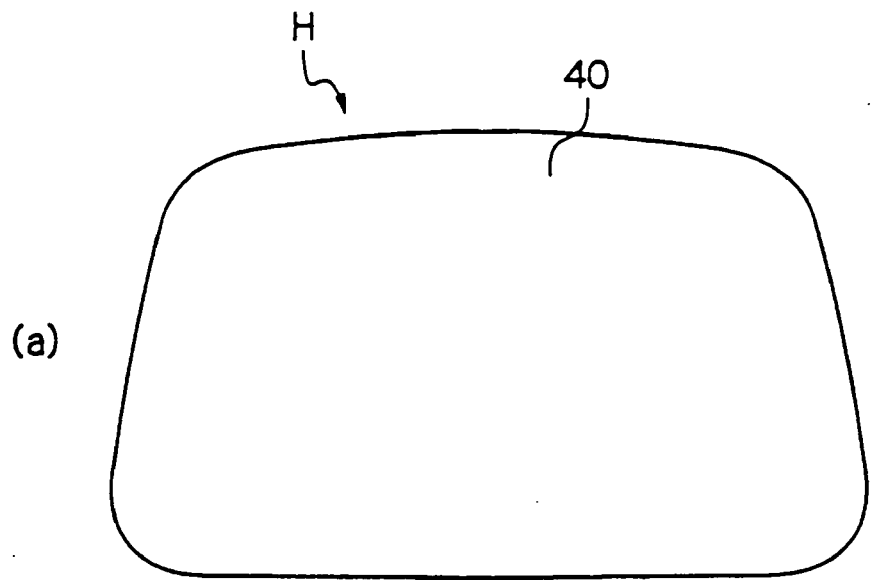
(a)
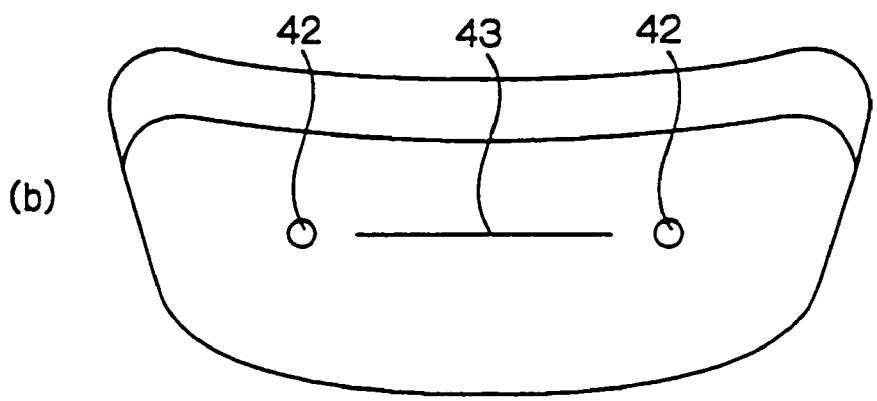
(b)
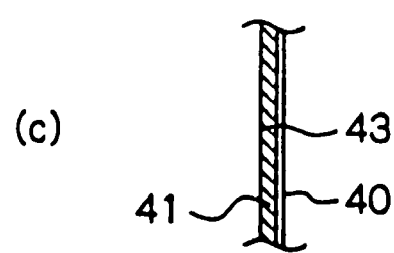
(c)

FILLED ARTICLE

This application is a 371 of PCT/JP00/00908 filed on Feb. 17, 2000.

TECHNICAL FIELD

The present invention relates to a padded body molding technique and, in particular, relates to a padded body composed of a skin layer formed in a bag shape and filler such as chips padded into the skin layer, a method for manufacturing such a padded body and padding and/or molding devices used for the manufacture thereof.

BACKGROUND OF THE ART

A cushion may be used for a headrest and an armrest equipped in an automobile. Such a cushion is composed of a skin layer formed in a bag shape and an inner body molded in a desired three-dimensional shape, and the inner body is inserted in and covered with the skin layer. The inner body is formed of filler such as urethane chips, and such an inner body can be obtained by passing steam through a mixture of urethane chips and a water reactive urethane binder to adhere those chips to each other.

However, a surface of such an inner body is not smooth, and a fraction of the inner body is easily separated from its surface even though the chips are firmly adhered to each other by the binder. Thus, it is not easy to cover the inner body with the skin layer.

In addition, since the surface of the inner body is not smooth as described above, it takes a along time for covering the inner body with the skin layer, and this makes the productivity worse. Also, even though such an inner body is covered with the skin layer, the skin layer is shifted relative to the inner body so that a wrinkle is produced on the surface of the skin layer and a seam of the skin layer is undesirably curved, and thus, as another problem, this makes its quality worse.

Moreover, if the inner body has a depression part, it is required to carry out a special treatment between the depression part formed on the inner body and the corresponding part of the skin layer to adhere therebetween. Such a special treatment is carried out using adhesive and the like. However, since a surface to be treated is inside the skin layer, such a treatment is difficult to carry out.

The surface-smoothness and the separation of a fraction of the inner body both become considerably worse, as the filler such as chips used for the inner body is harder. Thus, in the prior art, soft foamed urethane chips are used as the filler.

In productive steps of a seat and accessories equipped in an automobile, a large amount of waste such as foamed urethane chips and a piece of the skin layer is produced. Even though it is considered to recycle such waste, it is difficult to use the waste as filler used for the inner body due to the reasons described above.

Thus, the present invention is made to solve the above problems, and its object is to provide a padded body (typically used for a headrest and an armrest equipped in an automobile) composed of a skin layer formed in a bag shape and filler made of a granular or fragmental material such as chips padded into the skin layer and its manufacturing method, and according to the present invention, the padded body can be easily formed by padding the filler into the skin layer and its quality is stably maintained even though any filler having any hardness is used.

Another object of the present invention is to provide the padded body described above and its manufacturing method wherein the skin layer can be adhered to the filler padded into it so as not to separate the skin layer from a mass of the filler padded into it even though the padded body has a depression part.

Still another object of the present invention is to provide a padding and/or molding container for carrying out the method according to the present invention.

SUMMARY OF THE INVENTION

One aspect of the present invention is a method for manufacturing a padded body composed of a skin layer formed in a bag shape and filler made of a granular or fragmental material padded into the skin layer wherein the filler adheres to itself and adheres to the skin layers. In this method, a water reactive binder is mixed with the filler, and then, a mixture of the filler and the binder is padded into the skin layer to form a padded body. Then, steam is passed through the padded body so that the binder reacts to the steam passing through the padded body, and there by the filler adheres to itself and adheres to the inner surface of the skin layer.

Prior to passing steam through the padded body, the method includes setting the padded body in a molding container. The molding container has a predetermined cavity, and thereby the padded body can be molded into a predetermined shape.

Another aspect of the present invention is a method for forming a padded body composed of a skin layer formed in a bag shape and filler made of a granular or fragmental material to be supplied to the inside of the skin layer. In this method, the skin layer has at least a porous part and an opening, and this skin layer is set in a padding container. The padding container has an inner space, a suction port connected between the inner space and a pumping source and a supply port through which the filler is supplied to the inside of the skin layer. The supply port is provided in the padding container such that the opening of the skin layer set in the padding container can fit to the supply port, and thereby the skin layer is set in the padding container such that the opening of the skin layer fits to the supply port. Then, the pumping source is driven to produce airflow from the supply port to the inside of the skin layer through the opening and from the inside of the skin layer to the suction port Then, by use of this airflow, a predetermined amount of the filler is supplied to the inside of the skin layer to form a padded body.

The filler may be premixed with a water reactive binder, and the padded body may be set in a molding container having a predetermined cavity. Thus, the binder reacts to steam passing through the molding container, and thereby the filler adheres to itself and adheres to the skin layer.

Still another aspect of the present invention is a method for manufacturing a padded body composed of a skin layer formed in a bag shape and filler made of a granular or fragmental material padded into the skin layer wherein the filler adheres to itself and adheres to the skin layer. In this method, a water reactive binder is premixed with the filler. The skin layer has at least a porous part and an opening for supplying the filler to the inside of skin layer, and this skin layer is set in a padding and molding container. This padding and molding container has a cavity and a slide block that can move between an opening position and a closing position. When the slide block is moved into the closing position, the cavity is formed in a predetermined shape. The padding and molding container also has a supply port through which the filler is supplied to the inside of the skin layer and a suction port connected to a pumping source. When the slide block is moved into the opening position, the suction port connects between the cavity and the pumping source. The supply port is provided in the molding container such that the opening of the skin layer set in the padding and molding container fits to the supply port, and thereby the skin layer is set in the padding and molding container such that the opening of the skin layer fits to the supply port of the padding and molding container. Then, the pumping source is driven when the slide block is at the opening position, so that airflow is produced from the supply port to the inside of the skin layer through the opening of the skin layer and from the inside of the skin layer to the suction port. Then, a predetermined amount of the filler is supplied to the inside of the skin layer by use of this airflow to form a padded body. Then, the slide block is moved into the closing position, and then, steam is passed through the inside of the padding and molding container.

The other aspect of the present invention is a method for manufacturing a padded body composed of a skin layer formed in a bag shape and filler made of a granular or fragmental material padded into the skin layer wherein the filler adheres to itself and adheres to an inner surface of the skin layer. In this method, a water reactive binder is pre-mixed with the filler. The skin layer has at least a porous part and an opening for supplying the filler to the inside of skin layer, and this skin layer is set in a pre-molding container provided in a padding container. The padding container has an inner space, a suction port connected between the inner space and a pumping source and a supply port connected to the outside of the padding container. The pre-molding container has a cavity, an entry through which the filler is supplied to the inside of the skin layer and at least one through hole connected between the cavity and the inner space of the padding container. The entry is provided in the pre-molding container such that the opening of the skin layer set in the pre-molding container fits to the entry, and thereby the skin layer is set in the pre-molding container such that the opening of the skin layer fits to the entry of the pre-molding container. Then, the pumping source is driven to produce airflow from the supply port to the inside of the skin layer through the entry fitted to the opening of the skin layer by use of means for connecting between the supply port and the entry and from the inside of the skin layer to the suction port of the padding container through the through hole of the pre-molding container. Then, a predetermined amount of the filler is supplied to the inside of the skin layer by use of this airflow to form a padded body. Then, the padded body is set in a molding container having a cavity having a predetermined shape, and then, steam is passed through the inside of the molding container. It is desirable to use a funnel as the means for connecting between the supply port and the entry of the pre-molding container.

BRIEF DESCRIPTION OF DRAWINGS

FIG. 4 shows a headrest to be attached to a seat used for an automobile. FIG. 4a is a plan view of a skin layer of the headrest, FIG. 4b is a bottom view of the skin layer and FIG. 4c is a partial sectional view of the skin layer.

BEST MODE FOR CARRYING OUT THE INVENTION

As described in "Background of the art", there are several problems associated with inserting an inner body formed of filler in the inside of a skin layer formed in a bag shape. Also, it takes a long time for inserting such an elastic inner body in the inside of the skin layer while compressing the inner body. In contrast, according to the present invention, such problems do not arise. We now describe a method according to the present invention for manufacturing a padded body formed of filler made of a granular or fragmental material, with reference to FIG. 1.

Figure 1:
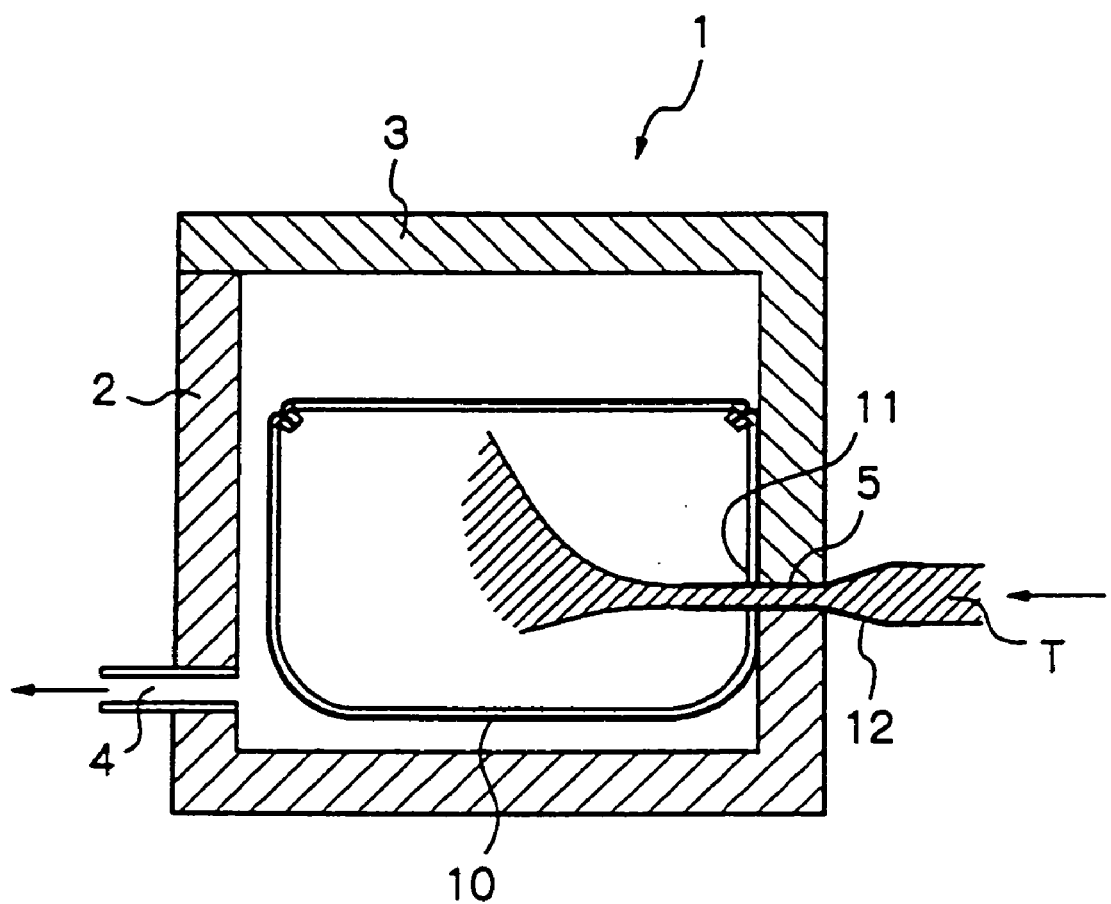
FIG. 1 shows that filler is supplied into the inside of a skin layer set in a padding container.

FIG. 1 shows one arrangement wherein filler T is supplied to the inside of a skin layer set in a padding container 1. The padding container 1 is constructed of two parts, one being a main part 2, and another being a lid part 3 that can seal air-tightly its inside. The main part 2 has a suction port 4 connected to a vacuum pump (not shown). Also, the padding container 1 has a supply port 5 for supplying the filler T. The supply port 5 is positioned opposite to the position of the suction port 4 and is positioned at a connection between the main part 2 and the lid part 3.

A skin layer 10 formed in a bag shape has a porous part and an opening 11, and the filler T is padded into the skin layer 10 through the opening 11. The opening 11 has a size fitted to the supply port 5 of the padding container 1.

The skin layer 10 is positioned in the main part 2 such that the opening 11 of the skin layer 10 fits to the supply port 5 of the padding container 1, and the padding container 1 is then closed by the lid part 3. The inside of the padding container 1 is air-tightly sealed by the lid part 3. In order to easily supply the filler T, a funnel 12 is positioned so as to pass through the supply port 5 and the opening 11.

In this arrangement, when the vacuum pump is driven, air inside the padding container 1 is evacuated and the inside of the padding container is decompressed, so that air flows from the outside of the padding container 1 into the inside of the skin layer 10 through the funnel 12 connected between the supply port 5 and the opening 11. That is, airflow is produced from the supply port 5 to the suction port 4 through the inside of the skin layer 10.

Then, when the filler T is delivered to the funnel 12, the filler T is transported by this airflow so that the filler T is supplied to the inside of the skin layer 10. After a predetermined amount of the filler T is supplied, the operation of the vacuum pump is stopped. Then, the lid part 3 is opened and a padded body 23 (FIG. 2) (the filler T is padded into the skin layer 10) is removed from the padding container 1.

As the filler used herein, not only a granular or fragmental material such as foamed urethane chips and a piece of cloth can be used, but also, for example, a very light weight material difficult to pad into the skin layer, such as feather of a feather pillow or a feather mat, can be used. In addition, a powder is difficult to handle when supplying to the inside of a skin layer because a power is dispersed. However, according to the present invention, a powder can be used as the filler.

In order to form a padded body wherein the filler adheres to itself and adheres to an inner surface of the skin layer, a water reactive binder is premixed with the filler, and a mixture of the filler and the binder is padded into the skin layer, as described above. Then, the opening of the skin layer is closed, and thereby such a padded body is formed.

Figure 2:
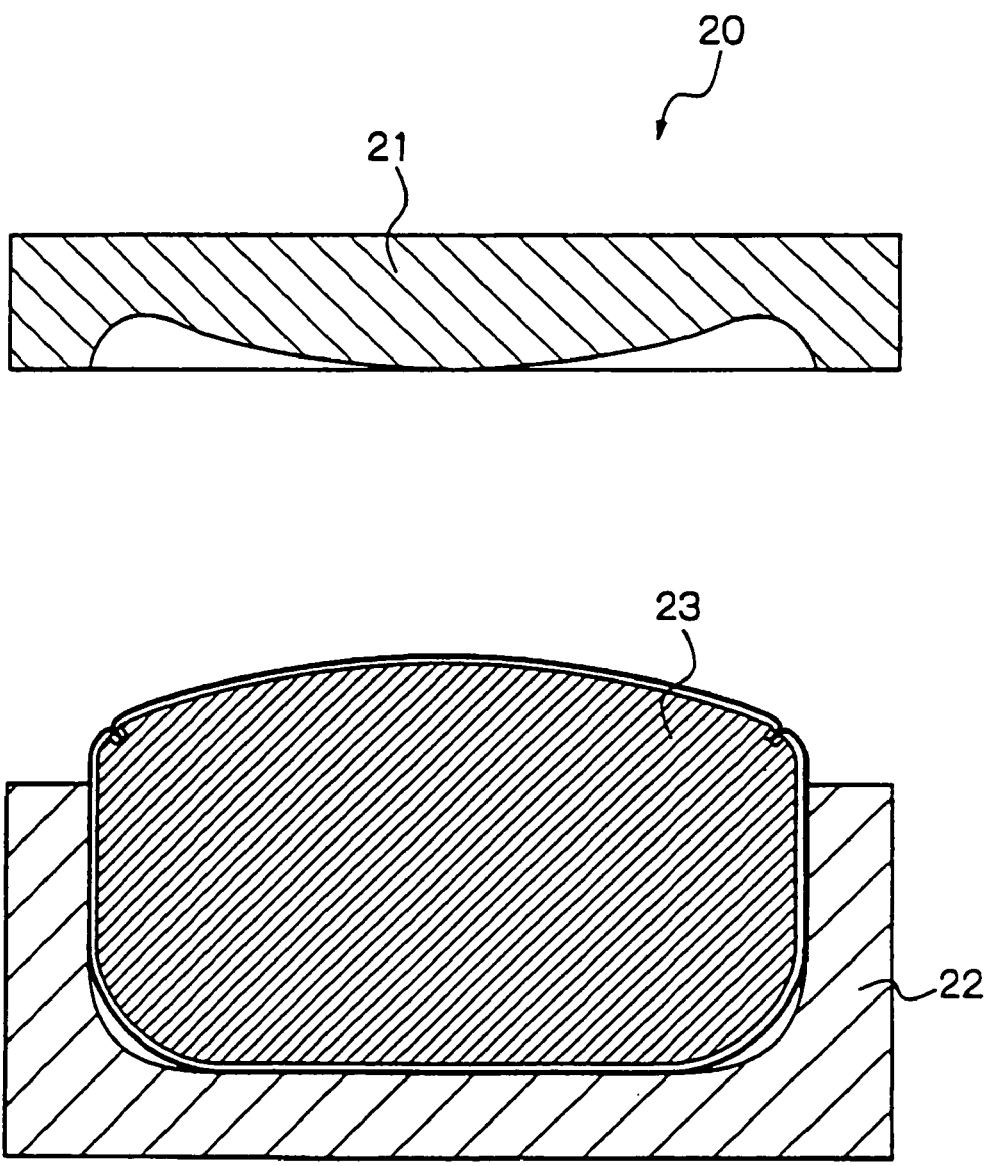
FIG. 2 shows that a padded body formed in a manner shown in FIG. 1 is set in a molding container.
Figure 3:
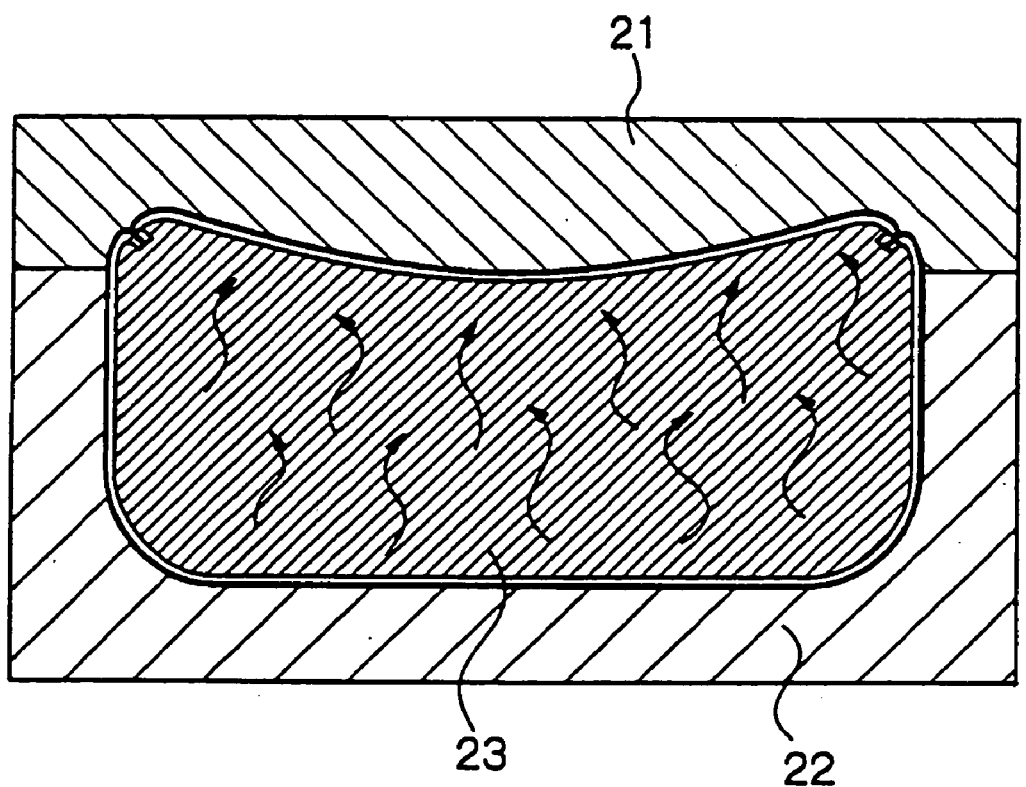
FIG. 3 shows that steam is passed through a padded body set in a molding container.

Then, the padded body 23 is set in a molding container 20 (an upper mold 21, a lower mold 22) as shown in FIG. 2 and is clamped between the upper mold 21 and the lower mold 22. Then, steam is passed through the inside of the molding container 20 (FIG. 3). The binder reacts to the steam so that the filter adheres to itself and adheres to the inner surface of the skin layer, and thereby a padded body that has a predetermined shape and is molded in one with the skin layer is manufactured.

As described above, since the padded body has already become a finished product molded in one with the skin layer when the padded body is molded, the work for inserting an inner body formed of the filler in the skin layer is avoided. That is, in the art, as a problem, it takes a long time for the work of inserting the inner body in association with the surface-smoothness of the inner body and the separation of a fraction thereof. However, according to the present invention, such a problem is avoided and the manufacturing cost is considerably reduced. Moreover, in the art, when the inner body is covered with the skin layer, the skin layer is shifted relative to the inner body so that a wrinkle is produced on the skin layer and a seam of the skin layer is undesirably curved, and thus, as another problem, this makes its quality worse. However, according to the present invention, such a problem does not occur.

In addition, in a padded body according to the present invention, since the filler adheres to an inner surface of the skin layer, the skin layer is not separated from the filler padded into the skin layer and is not shifted when practically using the padded body, and thus, the outline of the padded body can be stably maintained.

EXAMPLE 1

FIGS. 4–7 show a method according to the present invention for manufacturing a headrest attached to a seat equipped in an automobile.

FIG. 4*a* is a front view of a skin layer of the headrest and FIG. 4*b* is its bottom view. The skin layer 40 of the headrest H used herein is porous and is made of a fiber material, and a soft slab formed urethane 41 is attached on its back surface. On the bottom of the skin layer 40, holes 42, 42 are provided for inserting a stay 44 therein. Also, a slit 43 as an opening for supplying filler therein is provided on the bottom of the skin layer 40. This slit 43 is usually closed as shown in FIG. 4*c*.

Figure 5:
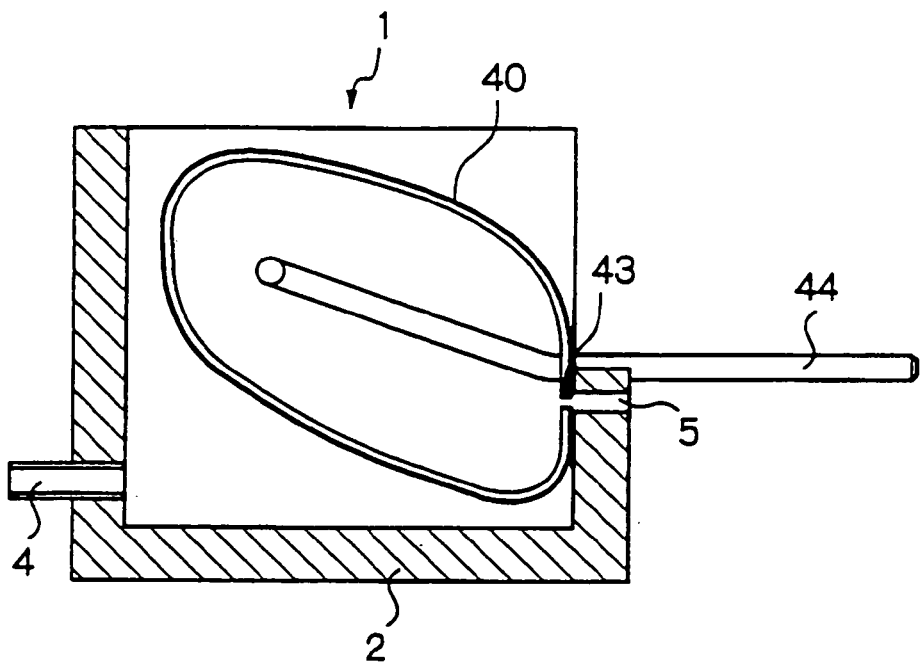
FIG. 5 shows that a skin layer is set in a padding container when its lid part is opened.
Figure 6:
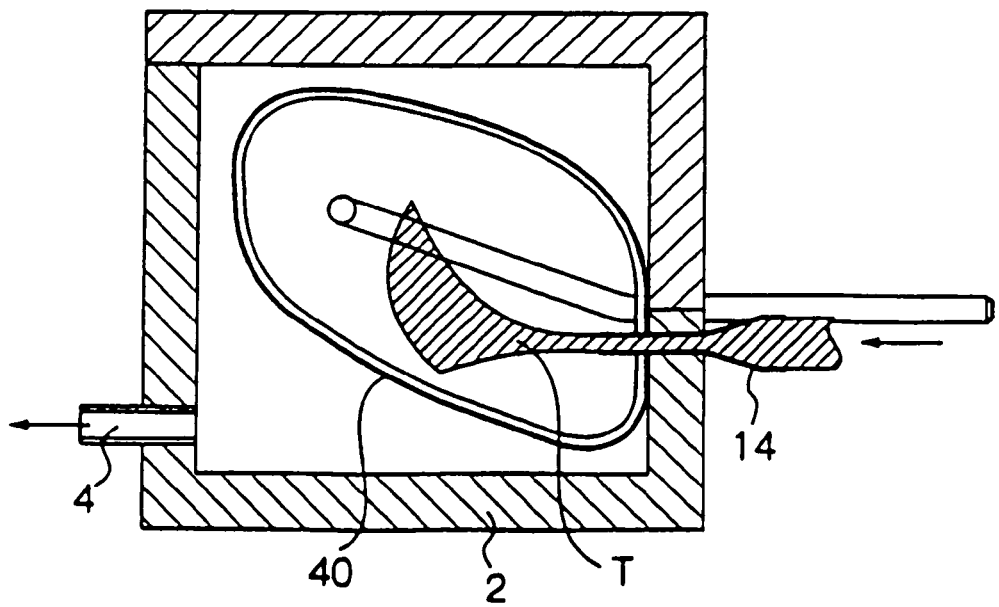
FIG. 6 shows that a padding container is closed by a lid part and filler is supplied to the inside of a skin layer by pumping the padding container.

The stay 44 is inserted in the skin layer 40, and the skin layer 40 is then set in the main part 2 of the padding container 1 such that the slit 43 fits to the supply port 5, as shown in FIG. 5. Then, the main part 2 is closed by the lid part 3, and the funnel 14 is positioned so as to pass through between the slit 43 and the supply port 5 (FIG. 6).

The filler T used herein is waste produced in productive steps for manufacturing a seat equipped in an automobile. The waste is made of a soft foamed urethane material and a skin layer material of the seat. The waste is shattered to pieces and is then passed through 5 mm screen mesh The filler T is a mixture of those fragmental materials. The mixture contains 50 wt % of soft foamed urethane and 50 wt % of the skin layer material. 20 wt % of urethane binder made of isocyanate pre-polymer (NCO: 15%) is sprayed to the filler, and then the mixture of the filler and the binder is stirred.

This urethane binder reacts to water so that its adhesive strength appears.

Then, the vacuum pump connected to the suction port 4 is driven, and thereby airflow is produced to the inside of the skin layer 40 through the funnel 14 positioned between the supply port 5 and the slit 43 and is produced to the suction port 4 through the skin layer 40. A predetermined amount (240 g for a typical headrest) of the filler T described above is supplied to the inside of the skin layer 40 by use of this airflow to form a padded body 46. In general, even though the skin layer 40 is formed in a predetermined shape, the padded body 46 expands over its predetermined shape when the filler is supplied.

Figure 7:
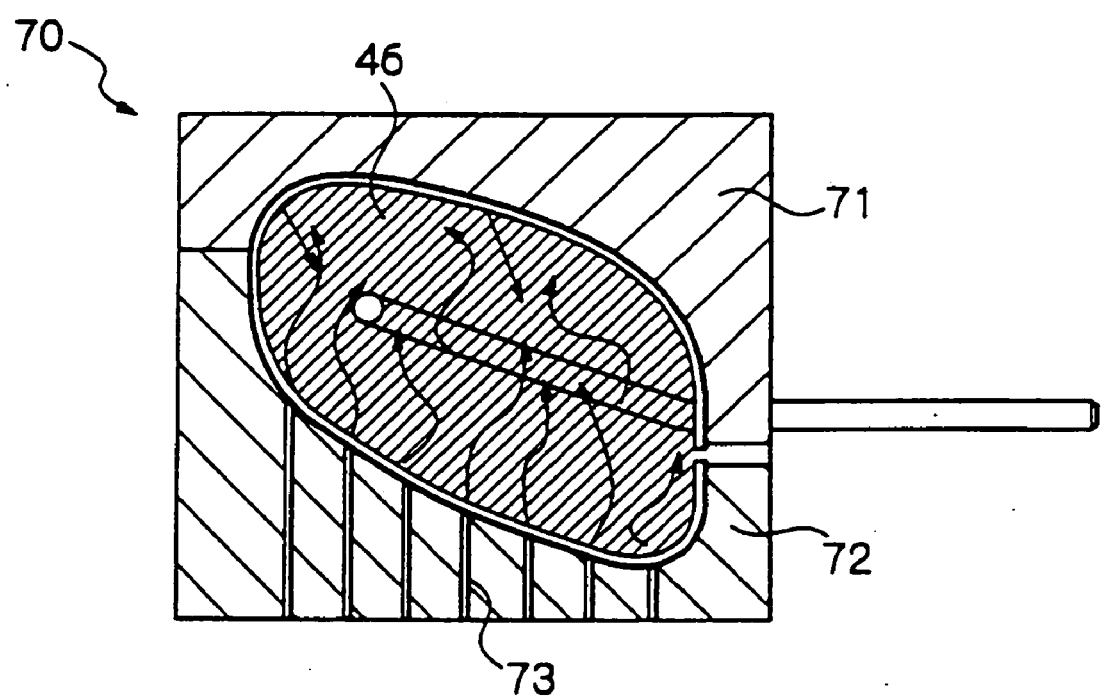
FIG. 7 shows that a padded body is set in a molding container and steam is passed through the inside of the molding container.

This padded body 46 is set in molding container 70 (an upper mold 71, a lower mold 72) having a predetermined cavity, as shown in FIG. 7. This molding container 70 has air holes 73 for supplying steam to the cavity (in this figure, the air holes are provided in the lower mold 72.

The padded body 46 is set in the molding container 70 and is then shaped in a predetermined shape. Then, steam (for example, 5 kg/cm$^2$, 1 minutes) is supplied to the inside of the molding container 70. Thereby, the binder reacts to the steam so that the filler adheres to itself and adheres to an inner surface of the skin layer, and thus, the padded body is completely molded in the molding container.

Finally, the padded body completely molded is removed from the molding container.

Prior to supplying the filler to the inside of the skin layer, a water reactive binder is pre-supplied on a contact surface between the filler and the inner surface of the skin layer or an inserted member (in this example, a stay 44). This is because the adhesive strength and the adhesive reliability between the filler and the inner surface of the skin layer and between the filler and the insert member can be improved.

EXAMPLE 2

In Example 1 described above, two separated devices such as the suction container and the molding container are used to mold the padded body. In Example 2, such a padded body is manufactured by use of only one device. Example 2 is now described with referring to FIGS. 8–11.

Figure 8:
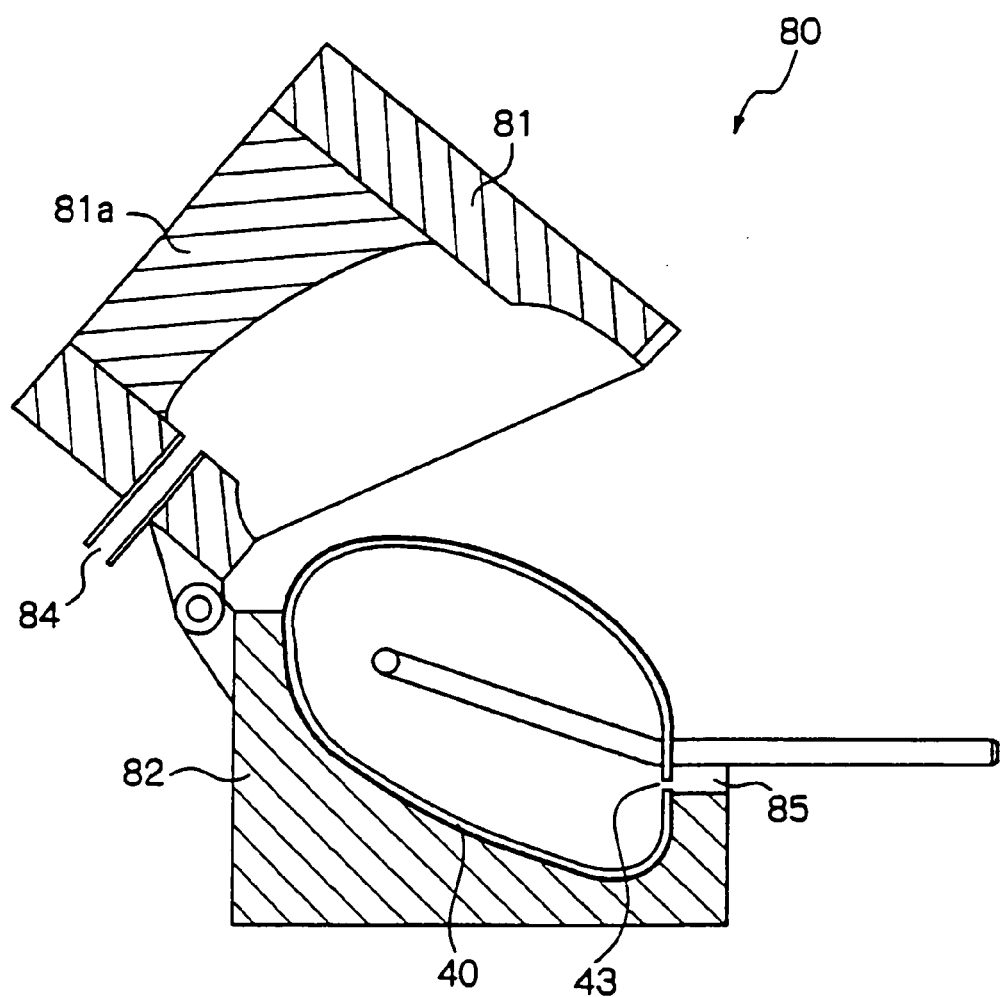
FIG. 8 shows that a slide block of a padding and molding container is moved into its opening position and a skin layer with a stay is set in the padding and molding container.

With reference to FIG. 8, a padding and molding container 80 has an upper mold 81 and a lower mold 82. The upper mold 81 is pivotally connected to the lower mold 82, and a cavity can be formed in the padding and molding container 80. The upper mold 81 has a slide block 81*a* and a suction port 84 connected to a vacuum pump. A supply port 85 is provided in the padding and molding container 80. The supply port 85 is provided at a position where the upper mold 81 meets the lower mold 82 such that the opening 43 of the skin layer 40 can fit to the supply port 85. Also, holes or channels (not shown) may be provided for position a stay.

While the padding and molding container 80 is closed by pivotally moving the upper mold 81, the slide block 81*a* can be air-tightly moved between an opening position and a closing position. When the slide block 81*a* is at the opening position, the cavity is connected to the vacuum pump through the suction port 84. When the slide block 81*a* is at the closing position, a predetermined shape of the cavity is formed inside the padding and molding container 80.

Figure 9:
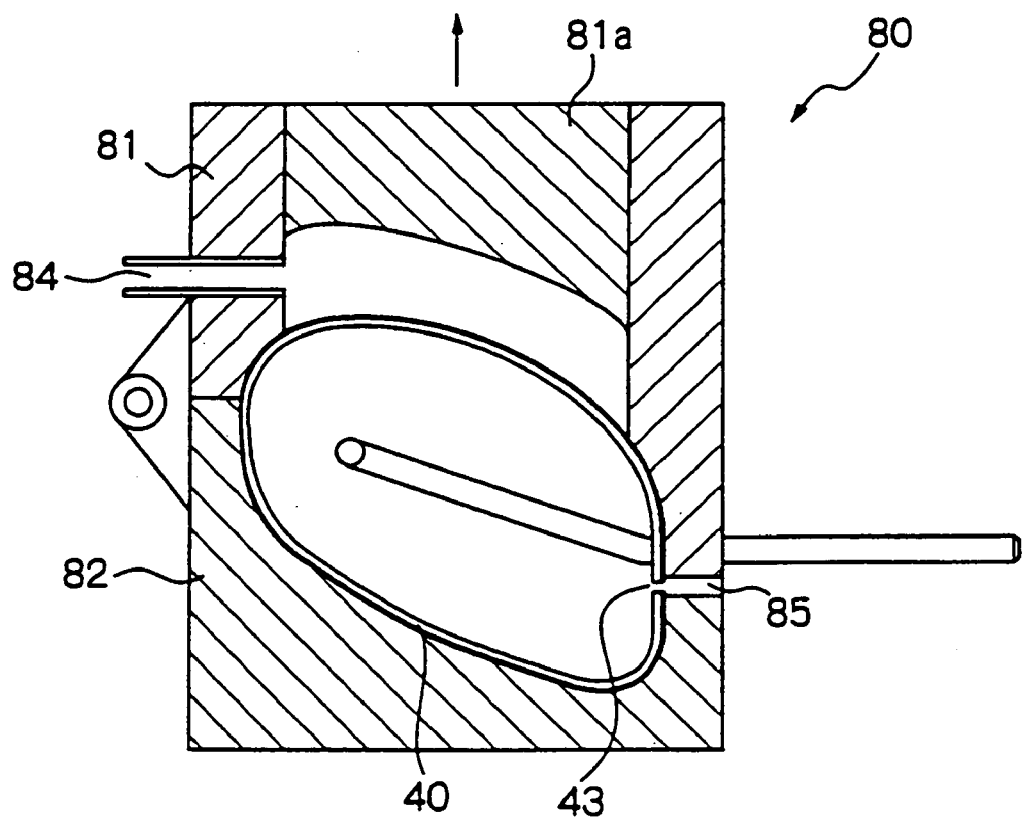
FIG. 9 shows that a slide block of a padding and molding container is moved into its opening position and a skin layer with a stay is set in the padding and molding container and this slide block is then moved into its closing position.

As shown in FIG. 8, the skin layer 40 with a stay is set in the padding and molding container 80 such that the slit 43 fits to the supply port 85. Then, as shown in FIG. 9, the upper mold 81 is pivotally moved and the padding and molding container 80 is then closed. When this, the slide block 81*a* is at its opening position, and the suction port 84 is connected to the cavity of the padding and molding container 80.

Figure 10:
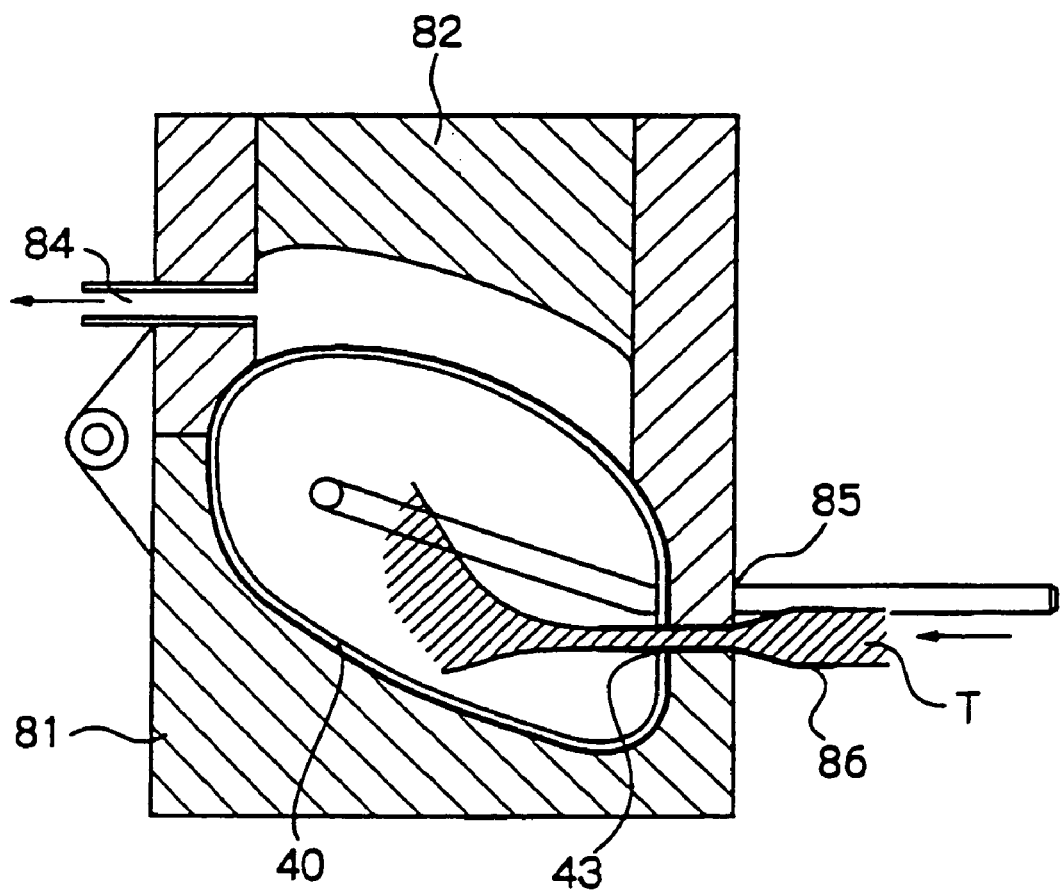
FIG. 10 shows that a slide block of a padding and molding container is at its opening position, and the padding and molding container is pumped and filler is supplied to the inside of a skin layer.

Then, as shown in FIG. 10, the funnel 86 is positioned so as to pass through the supply port 85 and the slit 43, and the vacuum pump is then driven. Thereby, airflow is produced to the inside of the skin layer 40 through the funnel 86 connected between the supply port 85 and the slit 43 and from the inside of the skin layer 40 to the suction port 84 through the cavity. By use of this airflow, the filler T mixed with the binder as provided in Example 1 is supplied to the inside of the skin layer 40. When a predetermined amount of the filler T is supplied to the inside of the skin layer 40, the operation of the vacuum pump is stopped, and thereby a padded body is formed.

Figure 11:
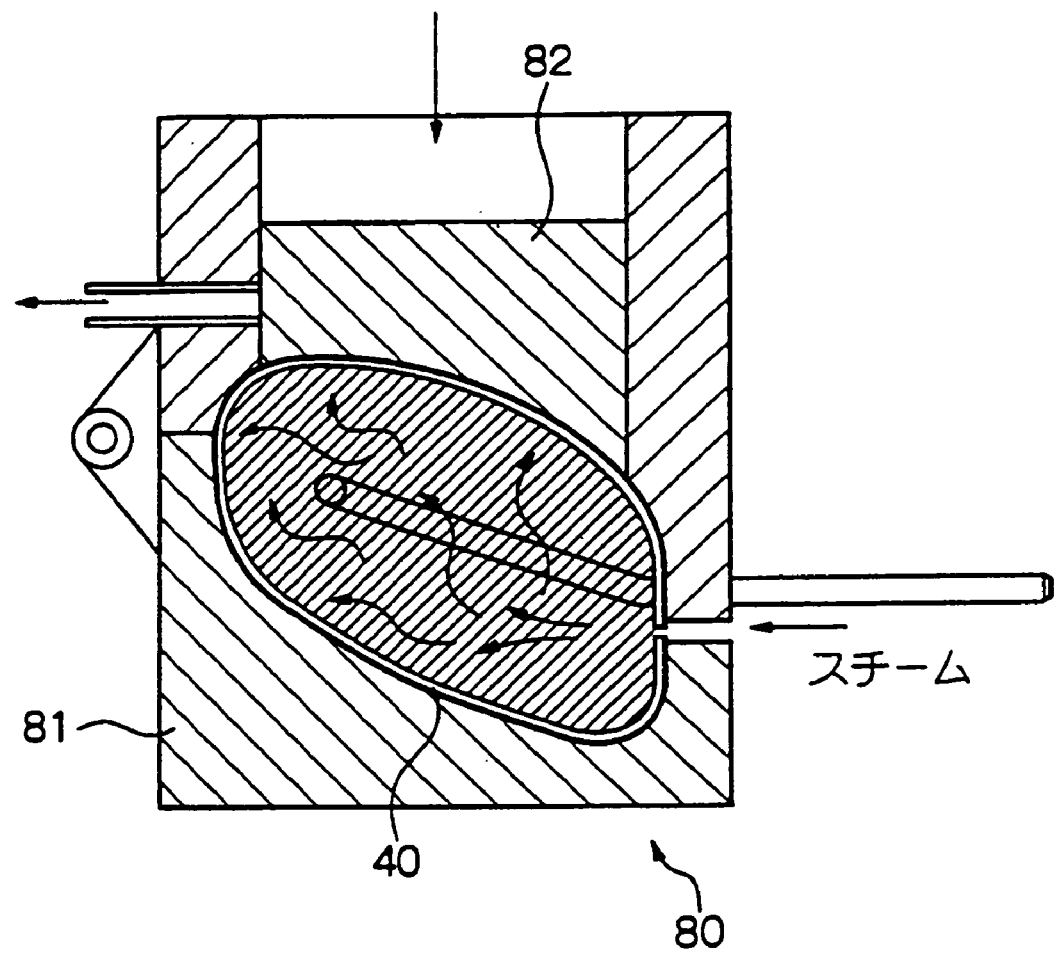
FIG. 11 shows that after filler is supplied to the inside of a skin layer, a slide block of a padding and molding container is moved into its closing position and steam is passed through the inside of the padding and molding container.

Then, as shown in FIG. 11, the slide block 81*a* is moved into its closing position, and thereby the padded body is formed in a predetermined shape. Then, steam is supplied in the padding and molding container 80, and as a result the padded body is molded in the predetermined shape, as described above in connection to Example 1.

EXAMPLE 3

Figure 12:
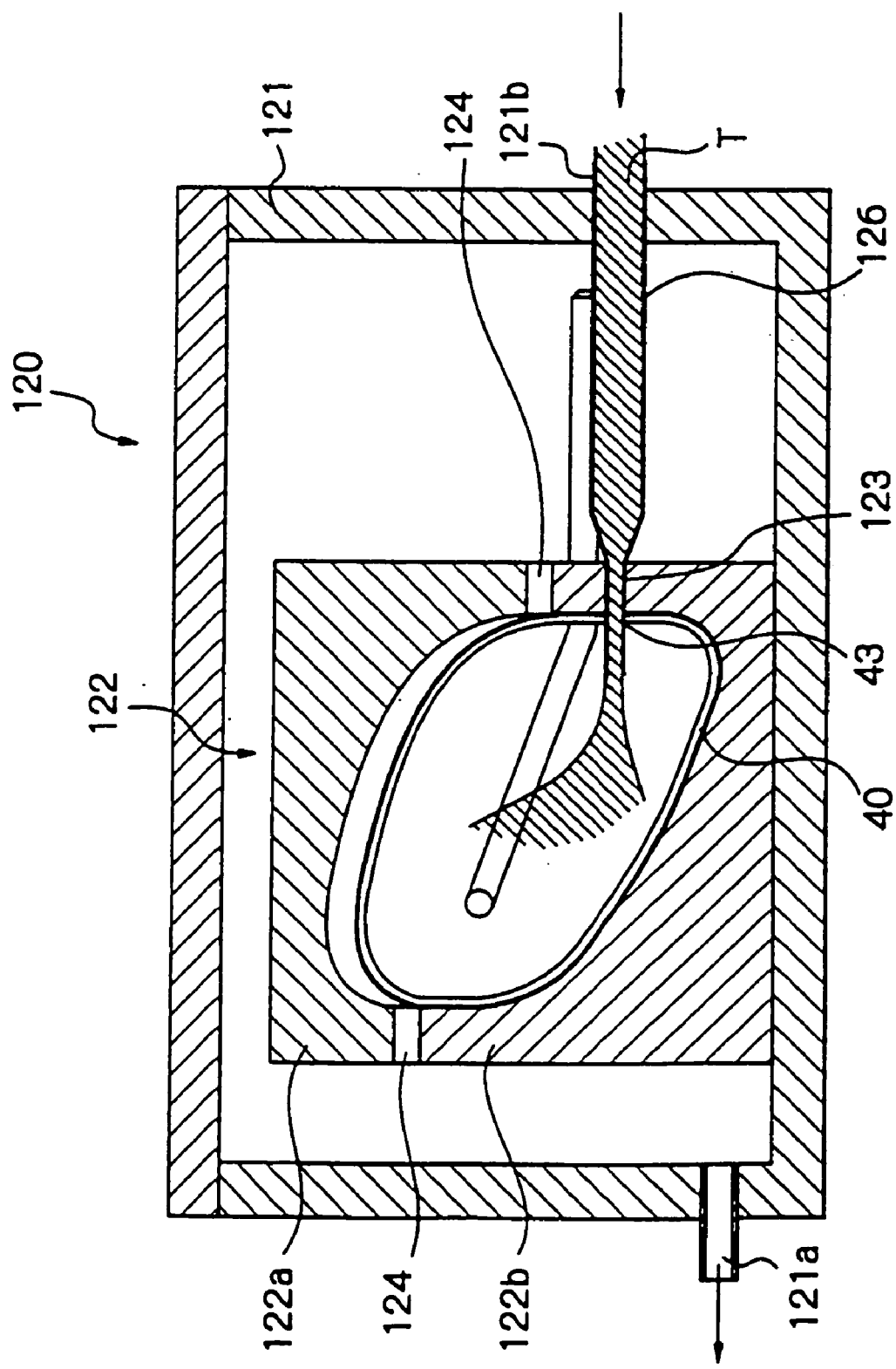
FIG. 12 shows that filler is supplied to the inside of a skin layer using a padding container according to the present invention.

FIG. 12 shows a method according to the present invention for forming a padded body using a padding container 120 comprising a suction container 121 and a pre-molding container 122 provided therein. The pre-molding container 122 has an upper part 122*a* and a lower part 122*b*. The pre-molding container 122 has a cavity slightly larger than a finished product. The lower part 122*b* is fixed in the suction container 121. The suction container 121 has a suction port 121*a* connected to a vacuum pump (not shown) and a supply port 121*b*.

The pre-molding container 122 has an entry 123 to be fitted to the slit 43 of the skin layer 40 and through holes 124, 124 connected between the inside of the pre-molding container and the inner space of the suction container 121. While the suction container 121 is evacuated, the cavity of the pre-molding container 122 is also evacuated through the through holes 124, 124. Thus, since those through holes 124, 124 determine a flow direction inside the cavity, filler can be evenly padded into the skin layer by appropriately determining a position of each through hole 124.

In order to form a padded body, firstly, the skin layer 40 with a stay is set in the pre-molding container 122, and the pre-molding container 122 is then closed by the upper part 122*a*. Then, a funnel 126 is inserted to the entry 123 fitted to the slit 43 through the supply port 121*b* of the suction container 121.

Then, the suction container is sealed air-tightly, and the vacuum pump is then driven. Thereby, air is evacuated through the suction port 121*a* and air inside the cavity of the pre-molding container 122 is also evacuated through the through holes 124. That is, airflow is produced to the inside of the skin layer 40 through the funnel 123 connected between the supply port 121*b* and the entry 123 fitted to slit 43 of the skin layer 40. By this airflow, filler T prepared in a predetermined manner is supplied to the inside of the skin layer 40.

Thereby, the filler T is padded into the inside of the skin layer 40, and thus, a padded body is formed. Then, this padded body is set in the molding container shown in FIG. 7, and thereby a padded body as a finished product is molded, as described in connection to Example 1.

According to the present invention, a padded body can be easily manufactured, without producing an undesirably curved seam and a wrinkle on the padded body, by padding filler into the skin layer and its quality is stably maintained even though any filler having any hardness is used.

Also, in a padded body manufactured according to the present invention, a skin layer of the padded body can be adhered to filler padded into it so as not to separate the skin layer from an inner body formed of the filler padded into it even though the padded body has a depression part.

In addition, according to the present invention, a padded body can be manufactured by use of filler made of a granular or fragmental material such as powder, feather, foamed urethane chips and a piece of the skin layer are produced in productive steps of a seat and accessories equipped in an automobile. In particular, according to the present invention, a padded body can be manufactured by use of a recycled material, as the filler, made of waste such as foamed urethane chips and a piece of the skin layer produced in productive steps of a seat and accessories equipped in an automobile.

What is claimed is:

1. A method for manufacturing a padded body comprising the steps of:
   preparing a skin layer formed in a bag shape, said skin layer having at least a porous part and an opening for supplying a granular or fragmental filler therein;
   setting said skin layer in a padding container, said padding container having an inner space, a suction port connected between the inner space and a pumping source and a supply port for supplying said filler, said skin layer being set in said padding container such that said opening fits to said supply port;
   driving said pumping source to produce airflow from said supply port to the inside of said skin layer through said opening and from the inside of said skin layer to said suction port; and
   supplying a predetermined amount of said filler to the inside of said skin layer by use of said airflow to form the padded body.

2. The method of claim 1, further including the steps of:
   premixing said filler and a water reactive binder;
   setting the padded body in a molding container having a predetermined cavity; and
   passing steam through the inside of said molding container, wherein said binder reacts to said steam, and thereby the filler adheres to itself and adheres to an inner surface of said skin layer.

3. The method of claim 2, wherein said filler is made of foamed urethane, cloth or plastics, and said binder is a urethane binder.

4. A method for manufacturing a padded body comprising the steps of:
- premixing filler made of a granular or fragmental material and a water reactive binder;
- preparing a skin layer formed in a bag shape, said skin layer having at least a porous part and an opening for supplying said filler;
- setting said skin layer in a padding and molding container, said padding and molding container having a slide block movable between a closing position and an opening position, a cavity formed in a predetermined shape when said slide block is moved into said closing position, a supply port for supplying said filler and a suction port connected between said cavity and a pumping source when said slide block is moved into said opening position, said suction port being closed by said slide block when said slide block is moved into said closing position wherein said skin layer is set in said padding and molding container such that said opening fits to said supply port;
- positioning said slide block at said opening position, and driving said pumping source to produce airflow from said supply port to the inside of said skin layer through said opening and from the inside of said skin layer to said suction port;
- supplying a predetermined amount of said filler to the inside of said skin layer by use of said airflow to form a padded body;
- moving said slide block into said closing position; and
- passing steam through the inside of said padding and molding container;
- thereby said binder reacts to said steam so that said filler adheres to itself and adheres to an inner surface of said skin layer.

5. A method of manufacturing a padded body comprising the steps of:
- premixing filler made of a granular or fragmental material and a water reactive binder;
- preparing a skin layer formed in a bag shape, said skin layer having at least a porous part and an opening for supplying said filler therein;
- setting said skin layer in a pre-molding container provided inside a suction container, said suction container having an inner space, an output port connected between the inner space and a pumping source and an input port connected to the outside thereof, said pre-molding container having a cavity, a suction port connected between said cavity and said inner space and a supply port disposed so as to fit to said opening, wherein said skin layer is set in said pre-molding container such that said opening fits to said suction port;
- driving said pumping source to produce airflow from said input port to the inside of said skin layer through said opening fitted to said supply port by use of means for removably connecting between said input port and said supply port and from the inside of said skin layer to said output port through said suction port;
- supplying a predetermined amount of said filler to the inside of said skin layer by use of said airflow to form a padded body;
- setting the padded body in a molding container having a cavity having a predetermined shape; and
- passing steam through the inside of said molding container;
- thereby said binder reacts to said steam, and said filler adheres to itself and adheres to an inner surface of said skin layer.

6. The method of claim 5, wherein a funnel is used as said means for removably connecting between said input port and said supply port.

* * * * *